Feb. 12, 1935.    F. NETSCHERT    1,990,747

THERMOSTATIC SNAP-ACTION MECHANISM

Filed May 20, 1932

Inventor:
Franz Netschert
By Wilson, Dowell, McCanna & Rehm
Attys

Patented Feb. 12, 1935

1,990,747

UNITED STATES PATENT OFFICE 1,990,747

THERMOSTATIC SNAP-ACTION MECHANISM

Franz Netschert, Lynwood, Calif., assignor to Grayson Appliance Co., Ltd., Lynwood, Calif., a corporation of California Application May 20, 1932, Serial No. 612,486

19 Claims. (Cl. 74—100)

This invention relates to an improved thermostatic snap-action mechanism.

The principal object of my invention is to provide a snap-action mechanism of simple, compact and economical construction involving not only an improved snap-action element, but also a push member specially constructed to cooperate therewith and facilitate assembling in a thermostatic valve structure, such as one for controlling the gas supplied to a storage type water heater.

A further object is to provide an improved bimetallic snap-action element suitable for use in thermostatic devices generally with or without a cooperating push member.

Another object is to provide an improved stuffing box for the movable thermostatic element, embodying a sliding cap telescoping on a portion of the bushing forming the sutffing box, whereby to eliminate gas leakage by setting up counter pressure.

Other objects will appear in the course of the following detailed description, in which reference is made to the accompanying drawing, wherein—

Similar reference numerals are applied to corresponding parts throughout the views.

Figure 1:
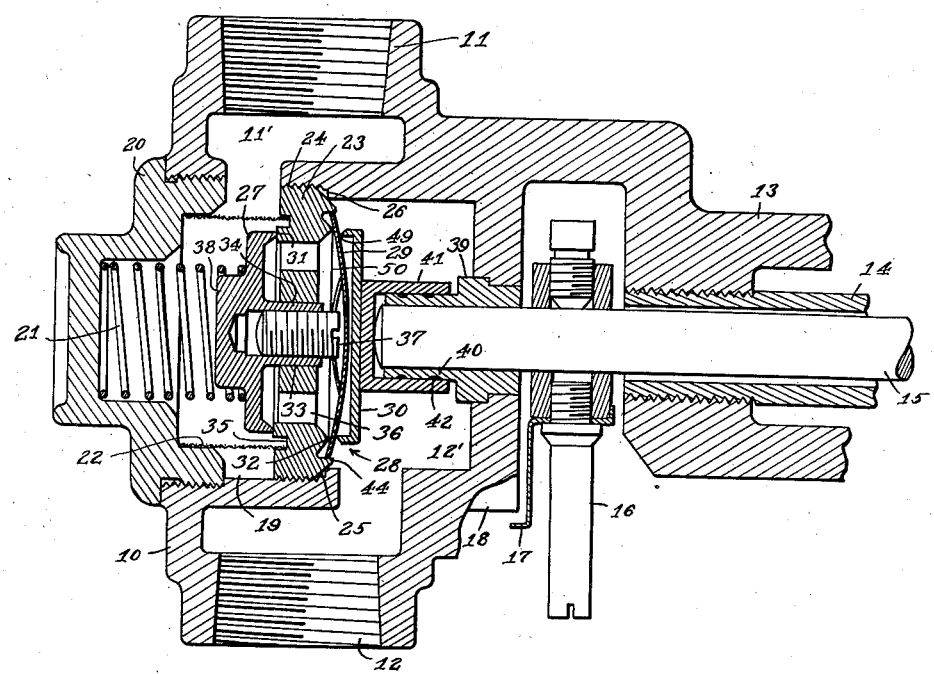
Figure 1 is a central longitudinal section through a thermostatic valve structure embodying the snap-action mechanism of my invention.

Referring to Figure 1, the numeral 10 designates the body or casing for the thermostat having an inlet 11 and outlet 12 into which gas supply and delivery pipes are arranged to be threaded, the delivery pipe extending to the main burner of the water heater or other gas appliance in connection with which the thermostat is used. It is also common practice to provide a tube communicating with the inlet to deliver gas to a pilot burner associated with the main burner. A boss 13, suitably formed integral with the body 10, serves to mount the thermostat in the wall of the tank, the extremity of the boss being usually threaded for that purpose. A thermostat, consisting of a tube 14 and rod 15, is mounted in the boss 13 and extends therefrom into the tank of the heater so as to be governed by the temperature of the water. The tube 14 is of copper or other material having a high coefficient of expansion, whereas the rod 15 is of invar or any other suitable material substantially free from expansion and contraction with temperature change. The tube has a plug in its outer end into which the outer end of the rod is threaded so as to move the rod inwardly upon contraction of the tube resulting from a drop in temperature, and the rod moves outwardly when the tube expands with a rise in temperature. The threaded connection between the rod and tube is a well-known expedient, and it is common practice to take advantage of this threaded connection for a temperature adjustment of the thermostat. Thus, I have shown a lever 16 fastened onto the rod between the body 10 and boss 13 for turning the rod in either direction according to the adjustment desired. A pointer 17 is moved with the lever relative to a surface 18 on the body 10 bearing a suitable temperature scale.

The inside of the body 10 is partitioned to provide inlet and outlet chambers 11' and 12', respectively, in communication with the inlet 11 and outlet 12 previously mentioned, and a cylindrical bore 19, substantially concentric with the thermostatic elements 14 and 15, connects said chambers. A cap 20 is threaded, as shown, into one end of the bore 19 to serve as a closure, as well as an abutment for one end of a coiled compression spring 21 and a tubular strainer 22. A bushing 23 is threaded as at 24 in the other end of the bore 19 and has a tapered inner end 25 arranged to jam against the annular shoulder 26 defining the inner end of the bore when the bushing is threaded home, whereby to prevent leakage around the bushing into the outlet chamber. The bushing 23 together with the valve 27 and the snap-action mechanism 28 are, in accordance with the copending application of John H. Grayson, Serial No. 614,397, filed May 31, 1932, a demountable working unit removable for purposes of inspection and cleaning and to permit replacement of any part when necessary. The snap-action mechanism 28 with which my invention is particularly concerned, as will soon appear, consists of the snap-action element 29 of spring material and its cooperating push member or plunger 30. The bushing 23, it will be observed, serves a four-fold purpose; it provides a valve seat 31 on one side, a support 32 on the other side for the snap-action mechanism 28, a guide 33 for the valve stem 34, and an annular seat 35 for the inner end of the strainer 22. A series of holes 36 is provided in the bushing in a circle circumscribed by the seat 31 for the passage of gas from the inlet chamber into the outlet chamber when the valve 27 is opened. A screw 37 is threaded in and projects from the end of the stem 34 of the valve to permit adjustment with respect to the snap-action mechanism 28, so that the valve will be opened when the snap action occurs, and not before. The adjustment of the screw also regulates the extent to which the valve will be opened. A cylindrical boss 38 formed on the back of the valve 27 is received in the inner end of the spring 21 and keeps the spring properly located, thereby facilitating assembling.

An improved stuffing box, forming part of the subject matter of the Grayson application, is provided for the movable thermostatic element 15. It comprises a bushing 39 mounted in the wall of the body 10 in the outlet chamber 12' and serving as a guide for the end of the rod 15. A reduced neck 40 is formed on the bushing to afford a longer bearing for the rod but principally to afford a mounting for a sliding cap 41 which fits over the neck and has the closed end thereof abutting the inner end of the rod 15. The cap 41 transmits movement to the push member 30 in the movement of the rod 15 incident to contraction of the tube 14 with drop in temperature, whereby to actuate the snap-action mechanism 28 to open the valve 27. Annular grooves 42 are formed in the outside of the neck 40 to hold lubricant for easy sliding of the cap back and forth on the neck in the expansion and contraction of the thermostat. The lubricant also affords a film to seal the sliding joint against gas leakage. It is well known that increasing the length of travel of the gas through a restricted passage results in cutting down its pressure to such a point that atmospheric pressure is enough to prevent leakage. In other words, a counter pressure is made available to prevent leakage and still the moving parts can work freely and there is no danger of sticking.

Figure 2:
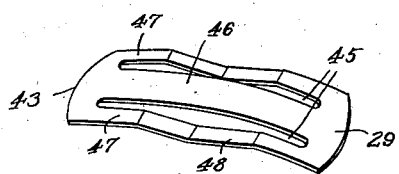
Fig. 2 is a perspective view of the snap-action element shown in section in Figure 1.
Figure 3:
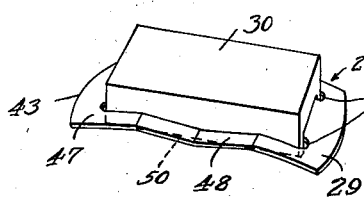
Fig. 3 is a similar view showing showing how the push member fits thereon.

The snap-action mechanism 28, with which my invention is particularly concerned, comprises a snap-action element 29 of spring material, and a push member 30 cooperating therewith. The element 29, as clearly appears in Fig. 2, is of elongated substantially rectangular form with the ends arcuate, as appears at 43, to conform to the inside of the annular rim 44 on the bushing 23, circumscribing the annular knife edge support 32 for the snap-action mechanism. The element 29 is slotted longitudinally as at 45 so as to define a middle longitudinal rib 46 and side longitudinal ribs 47. The element is bowed longitudinally, as clearly appears in Figs. 1 and 2, and the side ribs each have a slight crimp 48 therein between the ends thereof, so that the side ribs are slightly shortened compared to the middle rib. It is immaterial how this difference in length between the ribs is secured so long as the length of the middle rib is increased relative to the length of the side ribs, without any change in the overall length of the element. For instance, I have found that by peening the middle rib of an element sufficiently to stretch the metal to make the middle rib longer than the side ribs, a very practical snap-action element can be secured. The theory of operation of this sort of snap-action element is this: When the element is supported at its opposite ends as at 32 and pressure is applied to the element by the push member 30 near the points of end support, as shown in Figure 1, the middle rib 46 of the element will be straightened out more and more as it approaches dead center, thereby causing the side ribs to stretch proportionately in an effort to equal the length of the middle rib. The moment, however, that the middle rib is moved slightly past dead center, the side ribs contract, the stretch therein being relieved, and the middle rib accordingly snaps to reversed curvature. Due, however, to the longitudinal curvature of the element and its resistance to straightening, the element normally assumes the shape shown in Figure 1, that is to say, as soon as the pressure which caused it to snap over dead center is relieved, the element snaps back to its normal curvature. The push member 30, as clearly appears in Fig. 3, is of elongated substantially rectangular form and has knife edges 49 on its opposite ends to bear on the snap-action element 29 near the points of end support 32. Longitudinal side flanges 50 are also provided on the push member to enter the slots 45, whereby to locate the push member on the snap-action element.

In operation, it should be clear from the foregoing that as the water in the tank drops in temperature, the consequent contraction of the tubular element 14 causes inward movement of the rod element 15, thereby moving the push member 30 toward the bushing 23. Eventually, when there has been a predetermined movement of the rod element 15, the snap-action element 29 is snapped over dead center and opens the valve 27 by engagement of the middle rib 46 with the end of the screw 37 on the valve stem. The burner is, therefore, thrown into operation to heat the water in the tank. The rise in temperature of the water causes expansion of the tubular element 14 and accordingly outward movement of the rod element 15. When there has been a predetermined movement of the rod element, the snap-action element 29 snaps back to its normal curvature, thereby permitting the valve 27 to close under action of its spring 21. Adjustment of the thermostat by means of the lever 16 determines the approximate temperature at which the water in the tank will be maintained.

Figure 4:
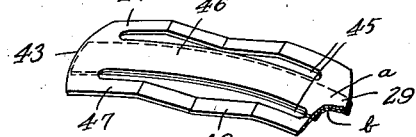
Figs. 4 and 5 are views similar to Fig. 2 showing bimetallic members.
Figure 5:
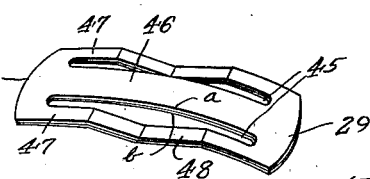

I do not limit myself to a snap-action element of the form disclosed in Fig. 2, namely, one which requires a push member, such as the member 30, to produce snap-action thereof. Thus, in Fig. 4, I have shown a bimetallic snap-action element 29' having its middle rib made up of two plies a and b having a certain differential so far as thermal coefficients of expansion are concerned, whereby heating of the element will cause the same to straighten out more and more, thereby causing the side ribs to stretch proportionately in an effort to equal the length of the middle rib. The moment, however, that the middle rib is moved slightly past dead center, the side ribs contract, the stretch therein being relieved, and the middle rib accordingly snaps to reversed curvature. Due, however, to the longitudinal curvature of the element and its resistance to straightening, the element normally assumes the shape shown in Fig. 4, that is to say, as soon as the temperature drops sufficiently, the element snaps back to its normal curvature. Now, it is, of course, apparent that a push member similar to the member 30 can be provided in connection with the element 29' either as an abutment therefor, where the element itself is to communicate movement to a part to be operated, or as a means of communicating movement from the element to the part to be operated. In other words, the element 29' may be used with or without a member 30. While I have shown the middle rib bimetallic in Fig. 4 it should be understood that the whole member may be of such construction, as illustrated in Fig. 5.

It is believed the foregoing description conveys a good understanding of all of the objects and advantages of my invention. The appended claims are drawn with a view to covering all legitimate modifications and adaptations.

I claim:

1. A snap-action element comprising a bowed elongated piece of spring material arranged to be supported at its ends and to have pressure applied thereto between its ends to force the same toward dead center, said piece having an approximately V-shaped portion intermediate its ends which is resilient in a direction longitudinally with respect to the piece, whereby to give in the straightening of the piece as it approaches dead center, and cause the piece to snap to reverse curvature when the same is moved beyond dead center.

2. A snap-action element as set forth in claim 1 wherein there are V-shaped resilient portions on opposite sides of the longitudinal center line of the piece.

3. A snap action mechanism comprising in combination a bowed elongated piece of flat spring material constituting the working element of the snap action mechanism, a stationary support for said element on which the element fulcrums at its opposite ends, the element being bowed outwardly relative to said support, and a movable push member for actuating the element formed to bridge the middle portion of said element and providing fulcrums engaging said element at two points spaced inwardly from the first mentioned fulcrums, the bowed piece having one or more substantially parallel longitudinal slots provided therein, and said push member having longitudinal flanges entered freely in said slots whereby to maintain the push member in operative relation to the piece.

4. A snap action mechanism comprising a bowed elongated piece of flat spring material constituting the working element of said mechanism, said piece having substantially parallel longitudinal slots provided therein defining a middle portion separated from side portions, the piece being formed so as to shorten the side portions with relation to the middle portion whereby to produce the bow in the piece and provide for snap action when the middle portion is forced past dead center, a stationary support for said element on which the element fulcrums at its opposite ends, the element being bowed outwardly relative to said support, and a movable push member extending over the middle portion and having fulcrums engaging the same at the ends in inwardly spaced relation to the aforesaid fulcrums so as to exert pressure on the middle portion to force the same over dead center.

5. A snap action mechanism comprising a bowed elongated piece of flat spring material constituting the working element of said mechanism, said piece having substantially parallel longitudinal slots provided therein defining a middle portion separated from side portions, the piece being formed so as to shorten the side portions with relation to the middle portion whereby to produce the bow in the piece and provide for snap action when the middle portion is forced past dead center, a stationary support for said element on which the element fulcrums at its opposite ends, the element being bowed outwardly relative to said support, and a movable push member extending over the middle portion and having fulcrums engaging the same at the ends in inwardly spaced relation to the aforesaid fulcrums so as to exert pressure on the middle portion to force the same over dead center, said push member having one or more longitudinal ribs projecting freely into the slots in said element whereby to maintain the push member in operative relation to the middle portion of the element.

6. A snap action mechanism comprising in combination a bowed elongated piece of flat spring material constituting the working element of the snap action mechanism, a stationary support for said element on which the element fulcrums at its opposite ends, the element being bowed outwardly relative to said support, and a movable push member for actuating the element formed to bridge the middle portion of said element and providing fulcrums engaging said element at two points spaced inwardly from the first mentioned fulcrums, the stationary support being formed so as to provide abutments for engagement with the ends of the snap action element at points beyond the fulcrums on said support, whereby to hold said element against endwise movement from a predetermined operative position.

7. A snap action mechanism as set forth in claim 3 wherein the stationary support is formed so as to provide abutments for engagement with the ends of the snap action element at points beyond the fulcrums on said support, whereby to hold said element against endwise movement from a predetermined operative position.

8. A snap action mechanism as set forth in claim 4 wherein the stationary support is formed so as to provide abutments for engagement with the ends of the snap action element at points beyond the fulcrums on said support, whereby to hold said element against endwise movement from a predetermined operative position.

9. A snap action mechanism as set forth in claim 5 wherein the stationary support is formed so as to provide abutments for engagement with the ends of the snap action element at points beyond the fulcrums on said support, whereby to hold said element against endwise movement from a predetermined operative position.

10. In a thermostatic device of the character described, comprising a casing, a thermostatic element arranged to move with respect to said casing in accordance with temperature change, and a valve or other element in said casing arranged to be operated in a predetermined movement of the thermostatic element, a snap action element of spring material, means in said casing for supporting said element at its ends so that the element is disposed with its intermediate portion arranged to operate the valve or other element, and a push member movable with the thermostatic element and having engagement with the snap action element near its supported ends, whereby to move the same over dead center for snap action thereof and abrupt operation of the valve or other element, the snap action element and push member being conformed with respect to one another so that the push member is guided by the snap action element and held in operative relationship thereto, the supporting means for the snap action element being formed so as to provide abutments for engagement with the ends of the snap action element at points beyond the points of support, whereby to hold said element against endwise movement from a predetermined operative position.

11. A snap action mechanism comprising in combination a bowed elongated piece of flat spring material constituting the working element of the snap action mechanism, a stationary support for said element on which the element fulcrums near its opposite ends, the element being bowed in one direction relative to said support, and a movable push member for actuating the element formed to bridge the middle portion of said element and providing fulcrums engaging said element at two points spaced from the first mentioned fulcrums, the bowed piece having one or more substantially parallel longitudinal slots provided therein, and said push member having one or more longitudinal flanges entered freely in said slots whereby to maintain the push member in operative relation to the piece.

12. A snap action mechanism comprising a bowed elongated piece of flat spring material constituting the working element of said mechanism, said piece having substantially parallel longitudinal slots provided therein defining a middle portion separated from side portions, the piece being formed so as to shorten the side portions with relation to the middle portion whereby to produce the bow in the piece and provide for snap action when the middle portion is forced past dead center, a stationary support for said element on which the element fulcrums near its opposite ends, the element being bowed in one direction relative to said support, and a movable push member extending over the middle portion and having fulcrums engaging the same at the ends in spaced relation to the aforesaid fulcrums so as to exert pressure on the middle portion to force the same over dead center.

13. A snap action mechanism comprising a bowed elongated piece of flat spring material constituting the working element of said mechanism, said piece having substantially parallel longitudinal slots provided therein defining a middle portion separated from side portions, the piece being formed so as to shorten the side portions with relation to the middle portion whereby to produce the bow in the piece and provide for snap action when the middle portion is forced past dead center, a stationary support for said element on which the element fulcrums near its opposite ends, the element being bowed in one direction relative to said support, and a movable push member extending over the middle portion and having fulcrums engaging the same at the ends in spaced relation to the aforesaid fulcrums so as to exert pressure on the middle portion to force the same over dead center, said push member having one or more longitudinal ribs projecting freely into the slots in said element whereby to maintain the push member in operative relation to the middle portion of the element.

14. A snap action mechanism comprising in combination a bowed elongated piece of flat spring material constituting the working element of the snap action mechanism, a stationary support for said element on which the element fulcrums near its opposite ends, the element being bowed in one direction relative to said support, and a movable push member for actuating the element formed to bridge the middle portion of said element and providing fulcrums engaging said element at two points spaced from the first mentioned fulcrums, the stationary support being formed so as to provide abutments for engagement with the ends of the snap action element at points beyond the fulcrums on said support, whereby to hold said element against endwise movement from a predetermined operative position.

15. A snap action mechanism as set forth in claim 11 wherein the stationary support is formed so as to provide abutments for engagement with the ends of the snap action element at points beyond the fulcrums on said support, whereby to hold said element against endwise movement from a predetermined operative position.

16. A snap action mechanism as set forth in claim 12 wherein the stationary support is formed so as to provide abutments for engagement with the ends of the snap action element at points beyond the fulcrums on said support, whereby to hold said element against endwise movement from a predetermined operative position.

17. A snap action mechanism as set forth in claim 13 wherein the stationary support is formed so as to provide abutments for engagement with the ends of the snap action element at points beyond the fulcrums on said support, whereby to hold said element against endwise movement from a predetermined operative position.

18. A snap action element comprising a bowed elongated piece of spring material slotted longitudinally to provide spaced interconnected portions, and arranged to be supported at its ends and to have pressure applied thereto between its ends to force the same toward dead center, said piece having an opproximately V-shaped portion intermediate the ends of one of said portions which is resilient in a direction longitudinally with respect to the piece, whereby to give in the straightening of the piece as it approaches dead center, and cause the piece to snap to reverse curvature when the same is moved beyond dead center.

19. A snap action element as set forth in claim 18 wherein the piece is slotted longitudinally in substantially parallel lines and there are V-shaped resilient portions in two of the spaced interconnected portions on opposite sides of the longitudinal center line of the piece.

FRANZ NETSCHERT.

CERTIFICATE OF CORRECTION.

Patent No. 1,990,747.  February 12, 1935.

FRANZ NETSCHERT.

It is hereby certified that error appears in the printed specification of the above numbered patent requiring correction as follows: Page 3, first column, line 42, claim 3, after "having" insert the words "one or more"; and that the said Letters Patent should be read with this correction therein that the same may conform to the record of the case in the Patent Office.

Signed and sealed this 19th day of March, A. D. 1935.

Leslie Frazer (Seal)  Acting Commissioner of Patents.